US009271572B2

(12) United States Patent  (10) Patent No.: US 9,271,572 B2
Fenelon                    (45) Date of Patent:   Mar. 1, 2016

(54) LIFT SYSTEM

(75) Inventor: Paul J. Fenelon, Nashville, TN (US)

(73) Assignee: Paul J. Fenelon, Nashville, TN (US)

( * ) Notice: Subject to any disclaimer, the term of this patent is extended or adjusted under 35 U.S.C. 154(b) by 0 days.

(21) Appl. No.: 12/901,158

(22) Filed: Oct. 8, 2010

(65) Prior Publication Data

US 2011/0089304 A1   Apr. 21, 2011

(51) Int. Cl.
F16M 11/00 (2006.01)
A47B 81/06 (2006.01)
A47B 9/04 (2006.01)
F16M 11/18 (2006.01)
F16M 11/24 (2006.01)
F16M 11/04 (2006.01)
F16M 13/02 (2006.01)

(52) U.S. Cl.
CPC .............. A47B 81/064 (2013.01); A47B 9/04 (2013.01); F16M 11/046 (2013.01); F16M 11/18 (2013.01); F16M 11/24 (2013.01); F16M 13/02 (2013.01); F16M 2200/028 (2013.01)

(58) Field of Classification Search
USPC ............... 248/157, 420, 651, 656, 658, 669, 248/188.1, 188.2, 188.4, 188.5, 125.1, 248/125.2, 404; 187/230
See application file for complete search history.

(56) References Cited

U.S. PATENT DOCUMENTS

| 706,302 A | 8/1902 | Darling |
| 720,728 A | 2/1903 | McDonald |
| 6,073,892 A | 6/2000 | Dittmer |
| RE37,559 E | 2/2002 | Marue |
| 6,352,226 B1* | 3/2002 | Gordon ..................... 248/125.2 |
| 6,416,027 B1 | 7/2002 | Hart |
| 6,494,150 B1 | 12/2002 | Phoenix |
| 6,612,670 B2 | 9/2003 | Liu |
| 6,796,537 B1 | 9/2004 | Lin |
| 6,831,829 B2 | 12/2004 | Einhorn |
| 6,902,243 B2 | 6/2005 | Bober |
| 7,044,423 B2 | 5/2006 | Bober |
| 7,128,003 B2 | 10/2006 | Okninski |
| 7,222,831 B2 | 5/2007 | Oddsen |
| 7,272,892 B2 | 9/2007 | Chung |
| 7,327,516 B2 | 2/2008 | Wheeler |
| 7,384,093 B2 | 6/2008 | Rasmussen |
| 7,407,239 B2 | 8/2008 | Kunz |
| 7,410,220 B2 | 8/2008 | Graham |
| 7,410,226 B1 | 8/2008 | Meskan |
| 7,458,546 B2* | 12/2008 | Jang ............................ 248/161 |
| 7,722,003 B2* | 5/2010 | Ishizaki et al. ........... 248/295.11 |
| 7,806,490 B1 | 10/2010 | Buehl |
| 2004/0090149 A1 | 5/2004 | Chang |

(Continued)

FOREIGN PATENT DOCUMENTS

WO   WO2007001327         2/2007
WO   PCT/US2011/055357   10/2011

OTHER PUBLICATIONS

Auton Motorized Systems, Auton Motorized Appliance Lift Series product specifications, 2005.

(Continued)

Primary Examiner — Monica Millner

(57) ABSTRACT

A household lift is provided with a stationary base and rack, wherein the movement of the drive gears and an associated movable portion is supported for linear motion parallel to the rack by at least a pair of extensible slides that are oriented at approximately right angles to one another.

19 Claims, 22 Drawing Sheets

(56) References Cited

U.S. PATENT DOCUMENTS

| | | |
|---|---|---|
| 2005/0045077 A1 | 3/2005 | Bober |
| 2005/0248243 A1 | 11/2005 | Bober |
| 2005/0275323 A1* | 12/2005 | Wilhelm ............... 312/319.5 |
| 2006/0075550 A1 | 4/2006 | Hanson |
| 2006/0180403 A1 | 8/2006 | Hanlon |
| 2006/0238086 A1* | 10/2006 | Lai ...................... 312/319.5 |
| 2006/0290248 A1 | 12/2006 | Chandler |
| 2007/0013827 A1 | 1/2007 | Fang |
| 2007/0035671 A1 | 2/2007 | Ryu |
| 2007/0211181 A1 | 9/2007 | Head |
| 2010/0176254 A1 | 7/2010 | Sweere |
| 2011/0001032 A1* | 1/2011 | Gardner ................. 248/404 |

OTHER PUBLICATIONS

Auton Motorized Systems, Auton Motorized Plasma/LCD Lift Series product specifications, 2005.

Auton Motorized Systems, Auton Motorized Plasma/LCD Lift & Swivel Series product specifications, 2005.

Auton Motorized Systems, Auton Motorized Slim Lift product specifications, 2005.

Auton Motorized Systems, Auton Motorized Table Lift Series product specifications, 2005.

Auton Motorized Systems, Auton Motorized Panel Lift Series product specifications, 2005.

Auton Motorized Systems, Auton Motorized LCD Display Lift product specifications, 2005.

Nexus 21 TV Lift Systems, Heavyweight TV Lift Model DL-39 technical specifications, 2008.

Nexus 21 TV Lift Systems, Compact TV Lift Model L-27 technical specifications, 2010.

Flatlift TV Lift Systeme GmbH, DIY Pop-Up Basic Lift Kit Operating Manual, 2008.

* cited by examiner

LIFT SYSTEM

FIELD OF THE INVENTION

The invention relates to a light weight lift system wherein the lift mechanism is separate from stabilizing elements.

BACKGROUND OF THE INVENTION

Lifting apparatus for televisions and monitors have been commercially available for more than 20 years. Most vendors of such lifting apparatus have designed lifting systems that were appropriate when large televisions and monitors weighed in the range of 100 pounds or more. The cost of such systems is substantial and as a result, these legacy lift apparatus have been most commonly deployed in custom installations for the wealthy and business enterprises. The expense of these legacy mechanisms is directly related to the cost to manufacture these relatively bulky, heavy and inefficient systems designed to lift weights in excess of 100 pounds.

Manufacturers have failed to revisit their legacy mechanisms' basic structure and design in light of the recent drastic changes in television designs and the reduction in weight of even relatively large screen televisions. This failure is understandable because:

(1) manufacturers continue to enjoy sales and profits from their legacy lift systems;

(2) manufacturers' costs for legacy lift designs are fully amortized, yielding handsome profit margins, and (3) competitive entrants to the market place for lift systems have been sparse.

The continued existence of high cost lift systems demonstrates the customer need and desirability to be able to hide a television or monitor. This need is also established by the extent and range of expensive armoires available that allow televisions to be hidden behind closed doors.

Prior art motorized lift systems would generally be classified into three distinct categories:

(1) Telescoping steel screw lift columns with multiple attachment brackets to anchor a ridged lift structure to a cabinet or support wall, as exemplified by Moebel TV lift products.

(2) Steel rectangular frames with integral heavy duty slides and complex metal rack and pinion gear or chain drive arrangements. The heavy duty steel frames provide fixed box-like stability after being anchored to a cabinet or support wall, as shown in the Nexus 21 TV Lift System Model L-27.

(3) Large box-like modular platforms driven at both edges by metal rack and pinion or metal screw mechanisms. The box-like structure provides stability as shown in the Auton Motorized Systems Standard Lifts.

These three arrangements described above typically weigh in excess of 40 pounds, have numerous functional components, and are insufficient both in their use of materials and energy. Insufficiencies result both because a part of the heavy structure moves up and down with the monitor and must be driven by the motor, and because it is necessary to use a larger motor for the resulting heavier load.

In summary, lifts available today for televisions, monitors, ergonomic desks, projectors, kitchen appliances, hidden safes, motion furniture, and other devices are either cumbersome, noisy, unstable, erratic, expensive, complex, heavy, inefficient, or a combination of some or all of these. There is a need for an efficient, economical, precision, smooth, quite, compact, light weight, simple, and preferably environmentally sound, lift mechanism which may be conveniently sized to fulfill a range of lifting needs from small to large and from light to heavy.

SUMMARY OF THE INVENTION

To achieve the design objective of producing an improved lift mechanism, it is necessary to analyze the basic mechanical functions that a lift system needs to accomplish and then combine the best solution to fulfill the functional needs for resulting lift weight and economical performance. Desirable mechanical and electrical functions include:

Power with little or no back-drive,
Smooth operation, and
Stability during and after the lifting process.
These objectives may be respectively achieved by:
Selecting a suitably sized and geared motor,
Selecting one of a number of lift means, including cable drives, scissor drives, linear actuators, rack and pinion, and dual rack and pinion drive systems, and
Selecting and placing sufficient guides or slides or a combination of both, and creating a self-contained box-like structure.

A novel class of lifts is achieved by using a worm gear motor to power a dual rack and pinion drive which is coupled with angled ball bearing extensible slides to achieve stability. To achieve the most cost effective, efficient system, the stability and lifting may be treated independently. Lifting may be achieved by positioning and operating a single powered dual rack and pinion system at or near the center of mass of the object to be lifted, thereby minimizing torque and unwanted moments. Stability may be independently realized by selecting, spacing and positioning a minimum number of ball bearing slides to achieve the stability objective. Angling the ball bearing slides may increase the realized stability. Lifting and ensuring stability for objects of different shapes requires the selection of two or more angled slides and the number of slides may vary according to the shape in accordance with the following general guidelines:

Flat screen television or monitor (narrow rectangular lift profile) and
Compact Circle (diameter≤about 24 inches) or Compact Square (≤about 24×24 inches)—2 slides;
Medium circular profile (diameter≤about 60 inches) and Medium Square (≤60×60 inches) or Medium rectangular profile (≤about 24×60 inches)—4 slides;
Large rectangular profile (≥about 24×60 inches)—6 slides;
Large squares (≥about 60×60 inches) and
Large circular profiles (diameters≥about 60 inches)—8 slides.

Most other shapes can be accommodated with between 2 to 8 slides.

To demonstrate and teach principles of the invention, two particular cases will be discussed in detail. The first is a lift designed to raise and lower flat screen television monitors, which the second is a lift design to raise and lower a coffee table so that it becomes a dining table.

BRIEF DESCRIPTION OF THE DRAWINGS

Various features, objects and advantages of the present invention will become apparent to those skilled in the art upon reading the following description in conjunction with these accompanying drawings.

DETAILED DESCRIPTION OF THE INVENTION

Figure 1:
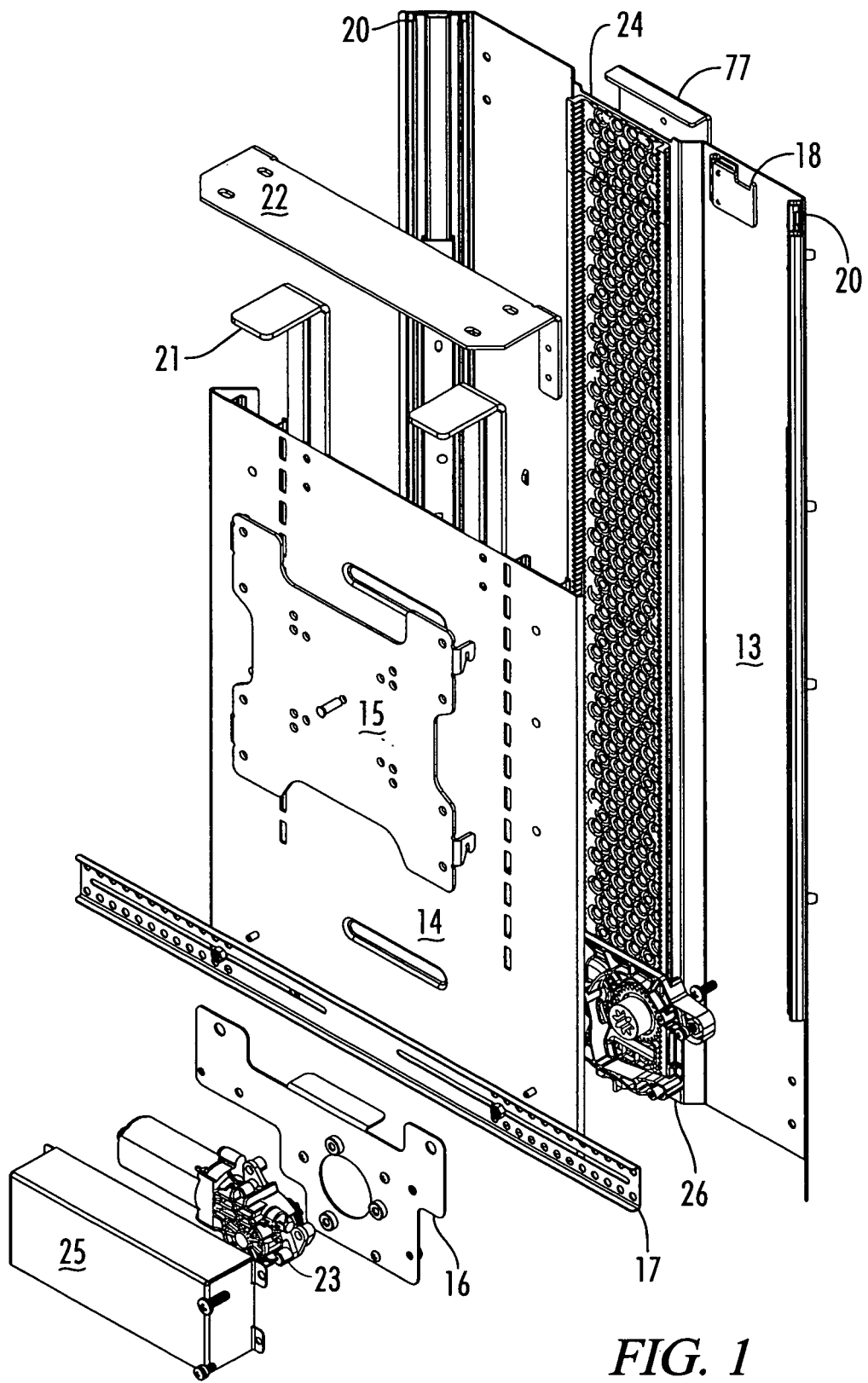
FIG. 1 is an exploded perspective view of an exemplary lift according to the invention optimized for raising and lowering an object with a narrow rectangular profile such as a television or monitor.

Televisions and monitors come in a wide variety of sizes and weights. The lift system illustrated in FIG. 1 is designed for use with flat screen televisions and monitors, and it will be understood that a range of lift sizes might be advantageously provided to cover the entire spectrum of television and monitors that are available. The illustrated example is selected to cover the mid-range sizes of flat screen televisions, generally ranging from about 32 inches to 46 inches in screen diameter. Televisions are not universally constructed to have the same structural framework or core rigidity; consequently, it is more convenient to raise and lower televisions by "hanging" the televisions through attachments to the back vertical surface or vertical sides rather than by "pushing" the televisions from their bases. Thin flat screen televisions are generally provided with a sizable vertical rectangular viewing surface and a narrow or slim rectangular base profile. For efficiency, the lift dimensions should be generally analogous to this rectangular shape, in a fashion that imparts stability to the lift and television assembly while minimizing the depth and space required for installation.

Turning then to FIG. 1, the functional assembly of a lift system is illustrated. The principle components include a base cage in the form of a stationary back plate 13, a rack 24, two angled slides 20, an inner cage in the form of a moving front plate 14, a mount plate 15, a cable mount plate 17, and a motor cover 25. As shown in FIG. 1, a motor 23 is positioned between the motor cover 25 and the motor bracket plate 16. Further, the motor engages with a gearbox 26. The stationary back plate 13 also serves as the mounting point for stop bracket 19 and safety plate 18 connected by a folding hinge.

Figure 2A:
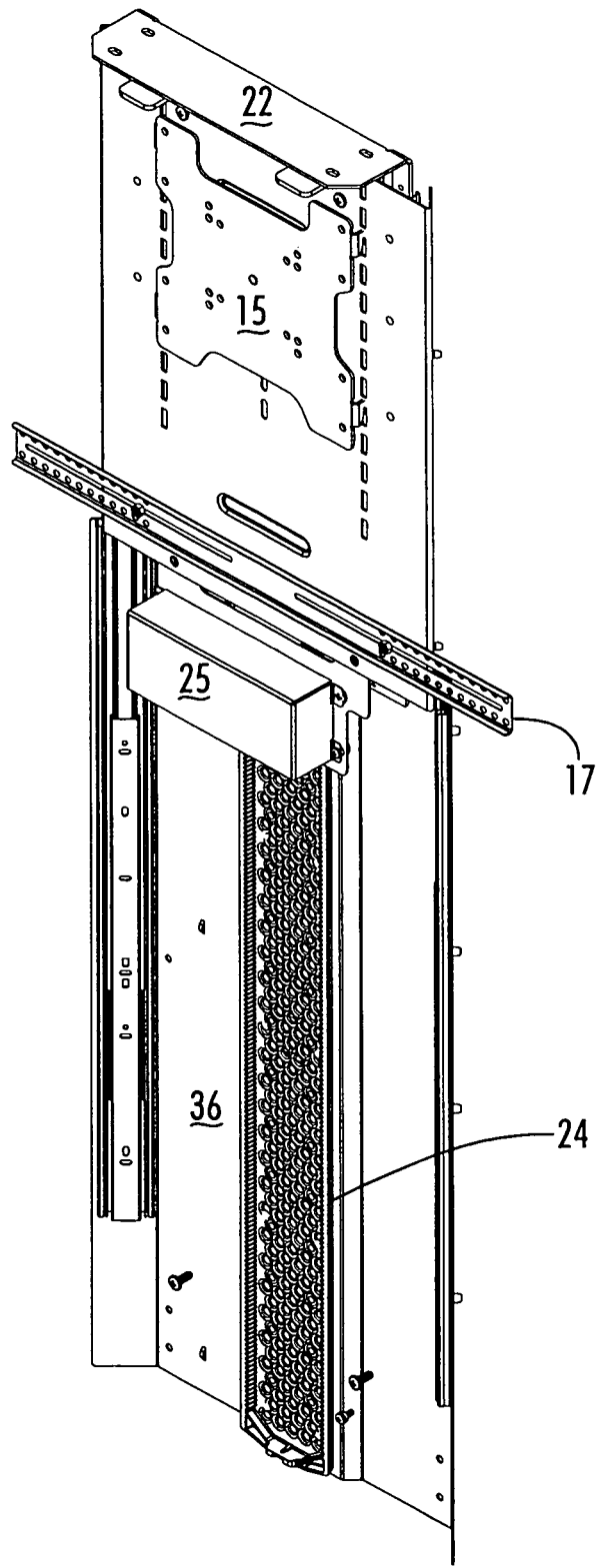
FIG. 2A is a perspective view of the lift system of FIG. 1 in fully extended or raised position.
Figure 2B:
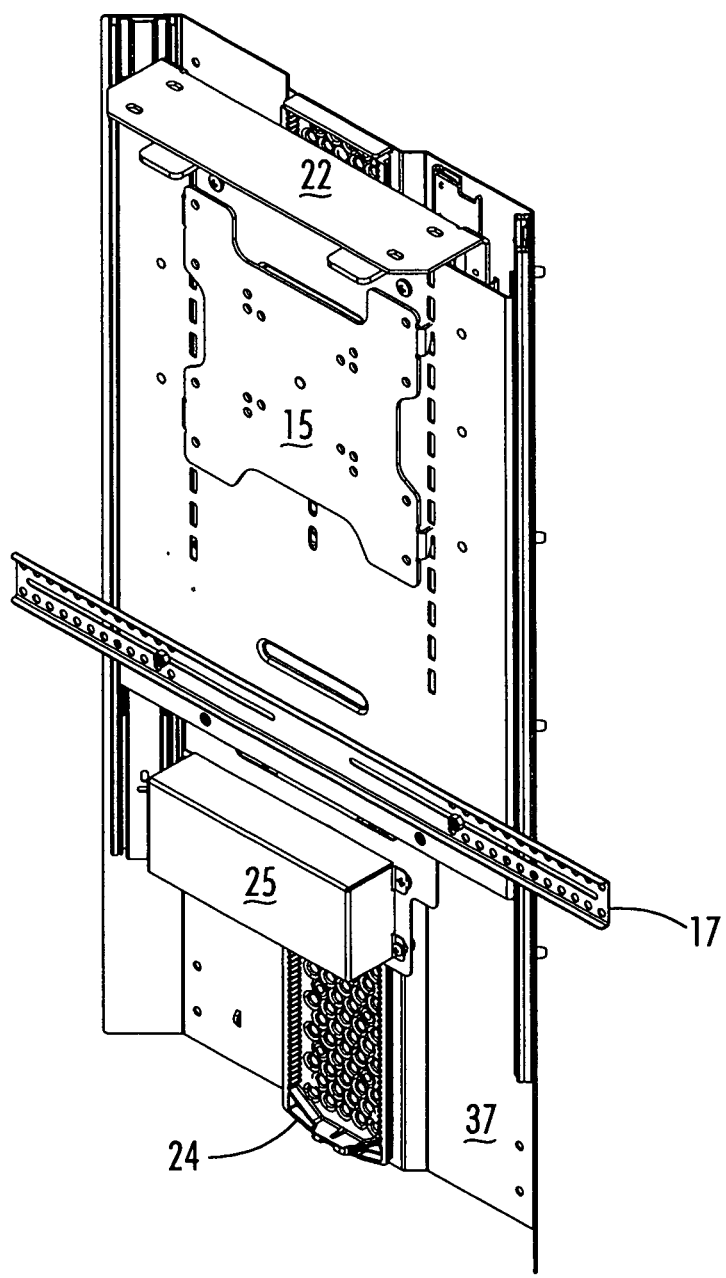
FIG. 2B is a perspective view of the lift system of FIG. 1 intermediate its extended and retracted positions.
Figure 3:
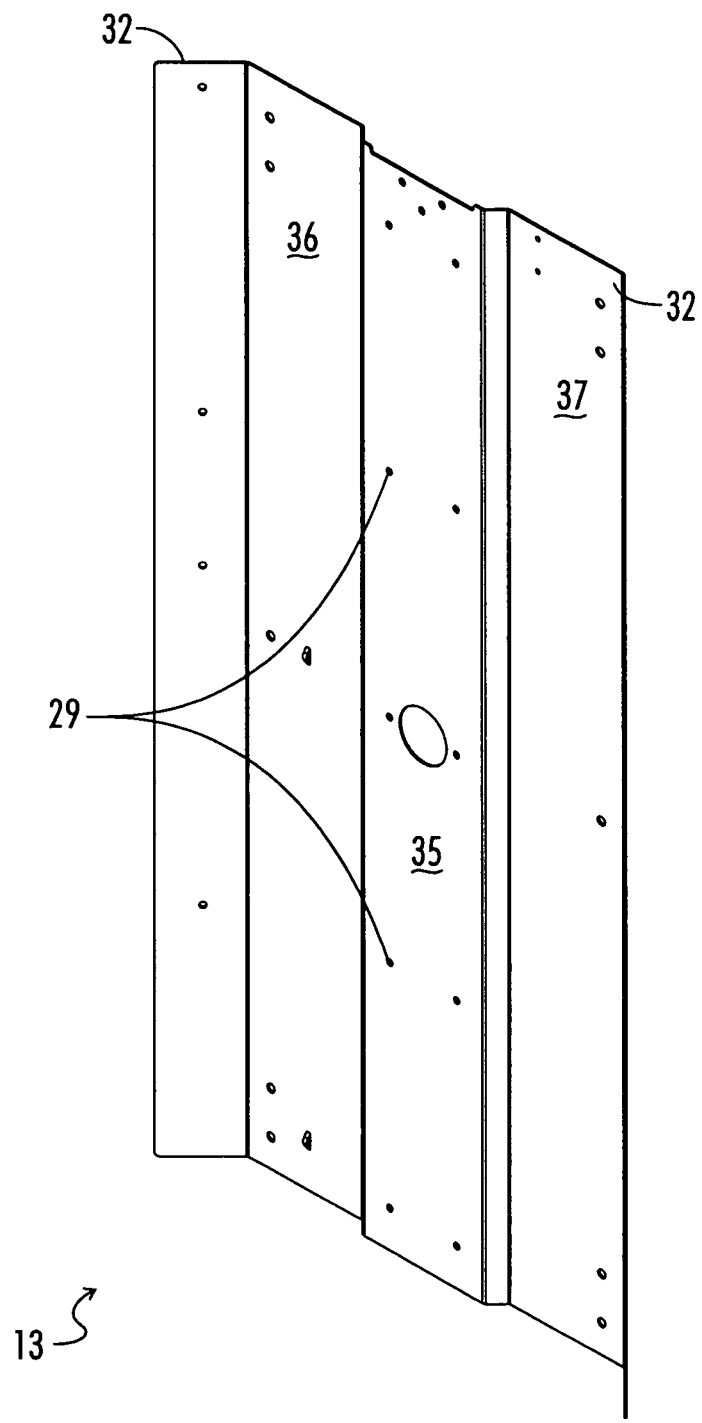
FIG. 3 is a perspective view of the back plate of the lift system of FIG. 1.

FIG. 2A shows the lift at full extension and FIG. 2B shows the lift at mid-extension. Each of the principal components may be examined in greater detail in isolation. In particular, FIG. 3 shows the stationary back plate 13 which is comprised of five principal segments. At either side of back plate 13 is an angled slide holder section 31, 32. These sections are preferably angled at approximately 45° from the planar orientation of back plate 13. The center portion 35 of back plate 13 serves as mounting surface for dual rack 24. To either side of the central rack mounting section 35 is a spacing section 36, 37 that provides additional clearance behind the mounted television and sufficient spacing from the rack to the angled portions 31, 32 for the slides mounted on the angle portions to serve their own stabilizing function. In the central section 35 there are openings 29 to facilitate mounting the rack 24. Other apertures on back plate 13 are used to mount ball bearing extensible slides on angled portions 31, 32 and to attach the back plate 13 to a stationary wall or support in the spacing sections 36, 37. Because the back plate is a securely fastened to a support or wall, the back plate itself need not be made of heavy gauge materials. Furthermore, the folds in the connecting sections, that are preferably at an angle of about 45°, between spacing sections 36, 37 and center portion 35 provide additional rigidity.

Figure 4A:
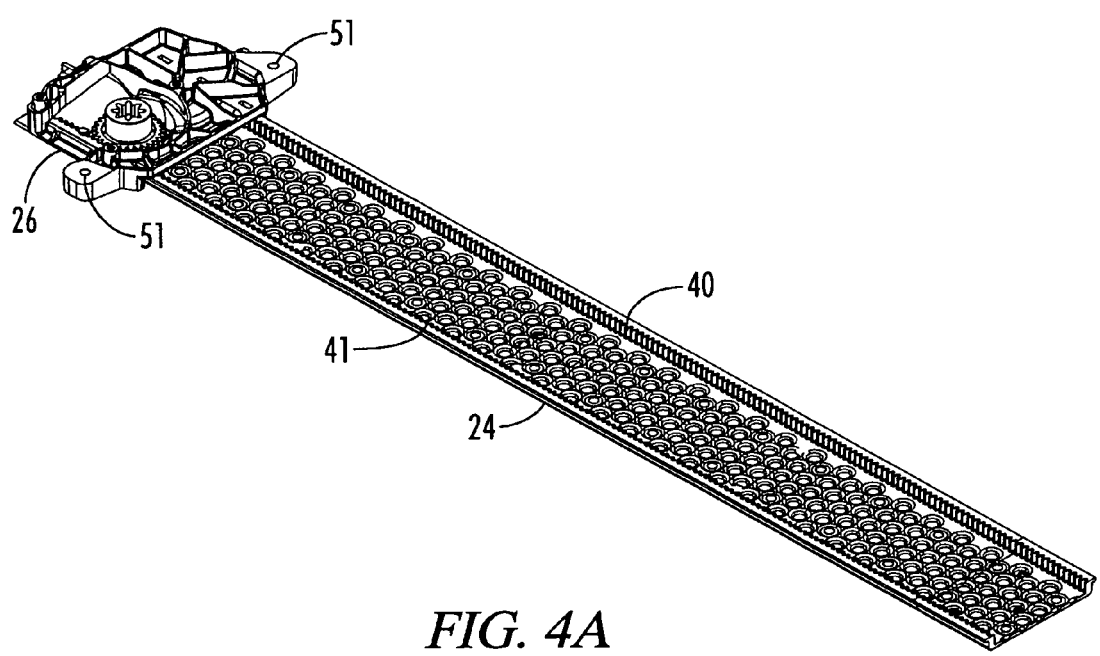
FIG. 4A is a perspective view of the rack and gear box of FIG. 1.
Figure 4B:
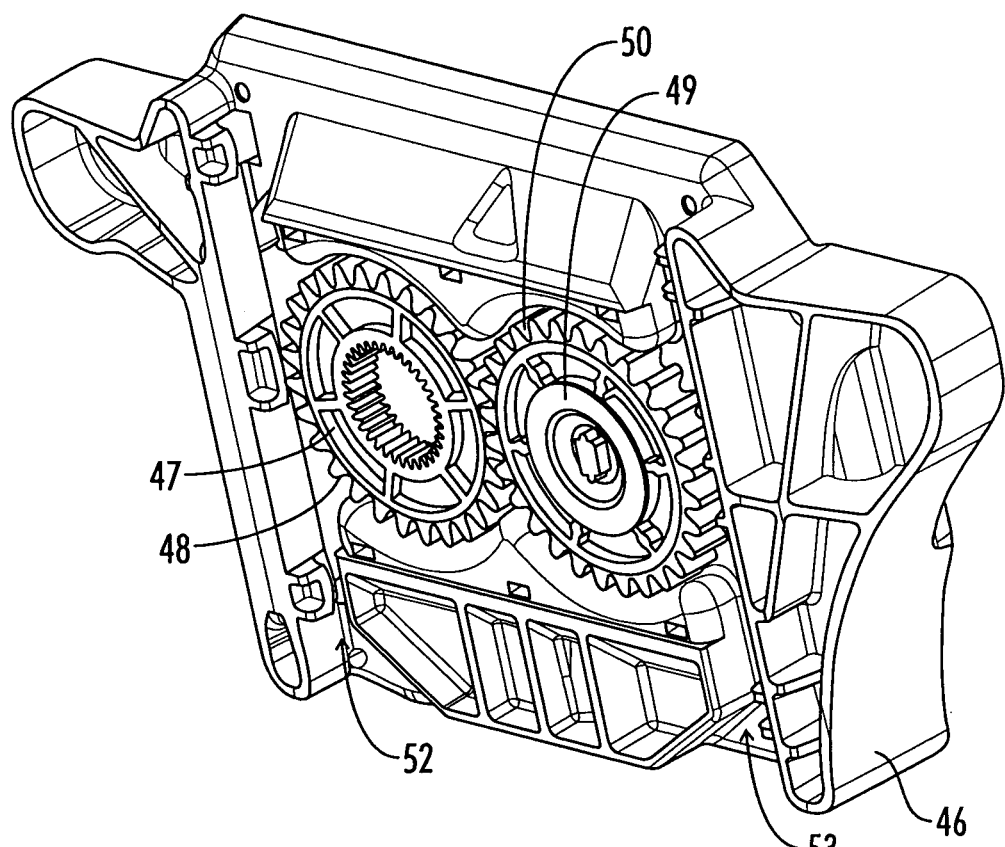
FIG. 4B is a reverse angle perspective view of the gear box of FIG. 4A shown in isolation.
Figure 5:
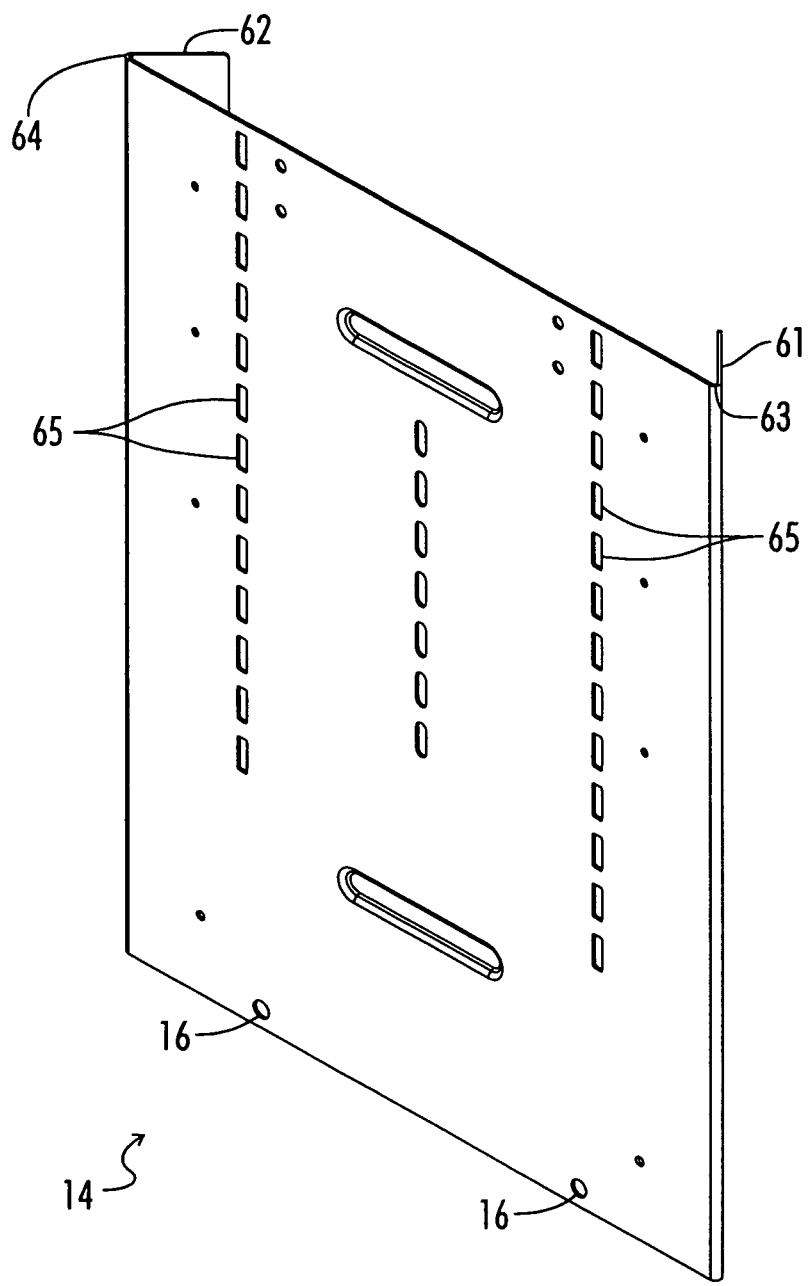
FIG. 5 is a perspective view of the moving front plate of the lift system of FIG. 1.

Turning then to FIGS. 4A and 4B, the rack 24 is illustrated with dual racks 40, 41 to engage with a pinion gear. An open gearbox 26 is shown at the lower end of rack 24 with apertures 51, 52 that are used to the join the gearbox to the moving front plate 14 shown in detail in FIG. 5. FIG. 4B illustrates the driven pinion gear 47 which with its teeth 48 engages with a matching spur gear 49. The gear teeth 48, 50 of the pinion gear 47 and spur gear 49 engage with the teeth in racks 40, 41 as the racks are received in channels 53, 52 of the gear housing.

The moving front plate 14 has apertures 66 near its lower edge through which fasteners are attached to secure the moving front plate 14 to the gearbox 26. In this fashion, the moving front plate 14 will ride with the gearbox along the rack 24 as the gear wheels 47, 49 are turned by the motor 23. Also of note on the moving front plate 14 are two rows of slots 65 which can receive tabs from the mount plate 15 shown in FIG. 6. In addition, the moving front plate 14 has rearward angled wings 61, 62 which are bent through a range of approximately 135° from the planar surface of moving front plate 14 at angle lines 63, 64. Angle wings 61, 62 are attached to the ball bearing extensible slides that are mounted on the angled edges 31, 32 of the stationary back plate 13. It will be seen that by positioning the slides between the moving front plate 14 and stationary back plate 13 at approximately a 45° angle, not only is rigidity added to the plates 13, 14, but the slides also are positioned at approximately 90° to each other in such a fashion as to simultaneously resist movement in both the front to back and side to side directions. Thus the angled slide connections provide stability in all directions while minimizing any friction or lack of smoothness in the movement of the lift system when it is raised or lowered. Finally the slots 67 on the moving front plate 14 are adapted to receive a horizontal portion 91 of stop bracket 77 to lock the moving front plate 14 in a vertical position.

Figure 6:
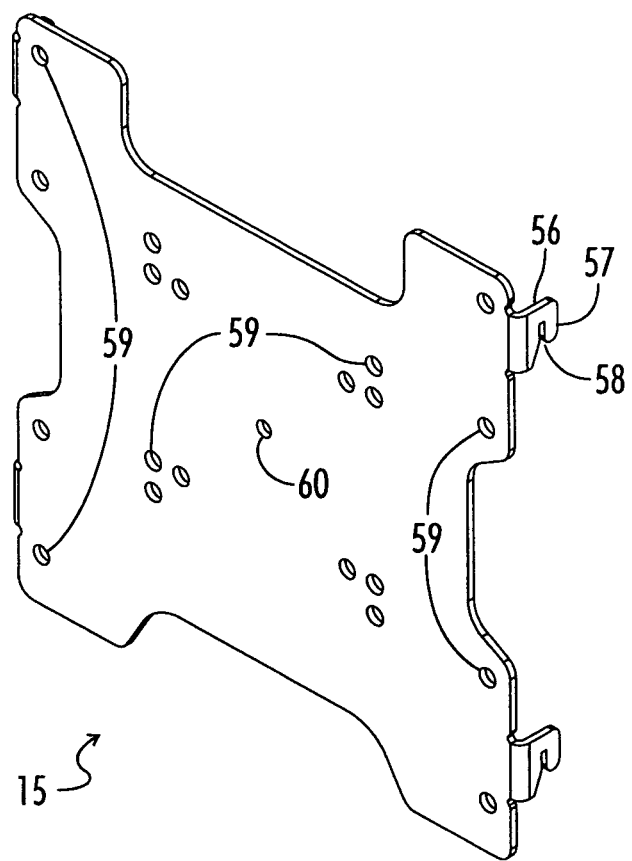
FIG. 6 is a perspective view of the mount plate of the lift system of FIG. 1.

Turning then to FIG. 6, the mount plate 15 is shown with four rearwardly extending feet 56 each having a downwardly extending tab 57 defined by upward channel 58. These tabs 57 are adapted to fit in the slots 65 of the moving front plate 14 shown in FIG. 5. However, before attaching the mount plate 15 to the slots 65 of the moving front plate 14, a monitor or television is first attached to apertures 59 which are positioned according to a mounting interface standard of the Video Electronics Standards Association (VESA). In addition, a fixed screw is placed in an aperture 60. Once the television and mounting plate 15 are connected to moving front plate 14, this screw is secured in a central slot on the moving front plate 14 as a security and safety precaution. Generally, when the mount plate 15 is attached to slots 65 of moving front plate 14 the relatively smaller monitors or televisions will be mounted in the lower slots 65 while larger televisions or monitors would be mounted in higher slots 65 so that a fixed stroke of travel will position the center of either size television to be at the correct height in the up position for optimum viewing of the central area of the television screen. This mechanical positioning simplifies the design of the electronic control necessary to automatically operate the television.

The electronic controls are further simplified by the choice of slides with up and down stops that insure stopping and avoid the need for the additional cost and complexity of micro-switches. The use of modulated current and time controls built into the automated controls for operating the motor can minimize the load sustained at the full up and down positions.

Figure 7:
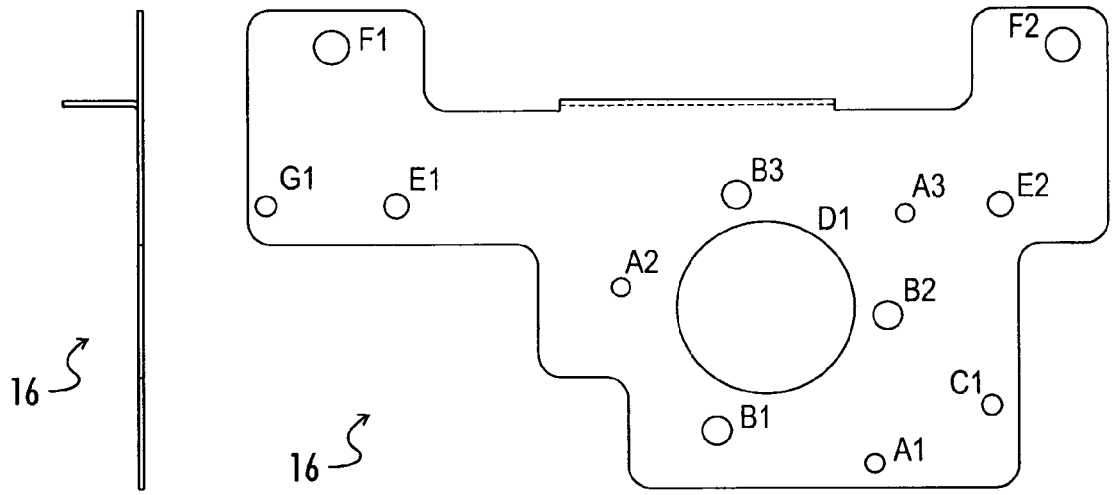
FIG. 7A is a side plan view of the motor bracket plate of the lift system of FIG. 1.
FIG. 7B is a front plan view of the motor bracket plate of the lift system of FIG. 1.
Figure 8:
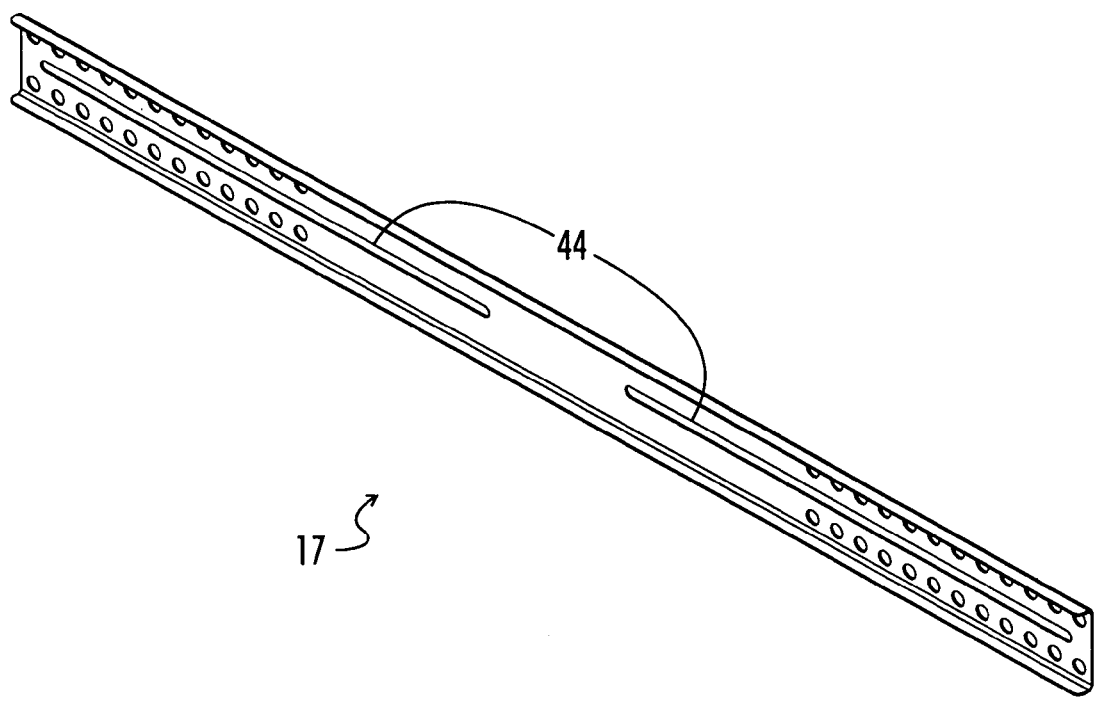
FIG. 8 is a perspective view of the cable mount plate of the lift system of FIG. 1.

FIGS. 7A and 7B illustrate the motor bracket plate 16 which allows the motor to be securely positioned and attached to the bottom of the moving front plate 14 and the associated gearbox 26. FIG. 8 illustrates the cable mount plate 17 with some apertures to attach to the bottom of the moving front plate 14 and slots 44 that together may receive ties to attach or pass through cables to the cable mount plate 17. Securing cables such as signal and power connections to the television mounted on the lift using ties will avoid an inadvertent loosening of those electrical connections by repeated operation of the lift.

Figure 9:
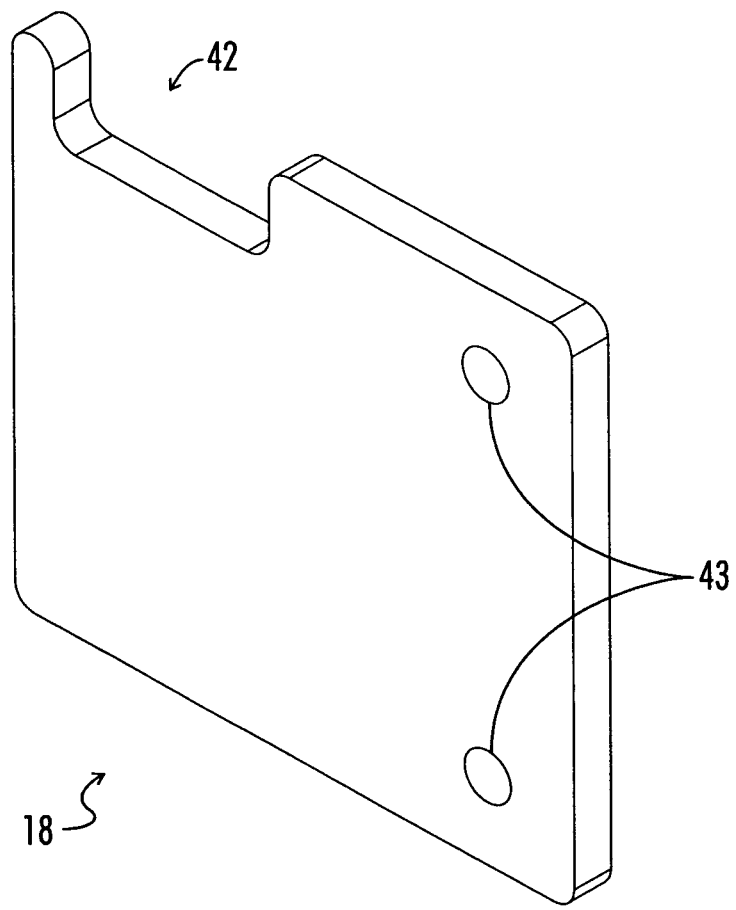
FIG. 9 is a perspective view of the safety plate of the lift system of FIG. 1.

Two additional features of the lift system are a hinged stop plate 18 and a self locating lid mechanism. The hinged safety plate 18 shown in FIG. 9 is hingedly connected through apertures 43 to apertures on section 37 of the stationary back plate 13. Generally this stop plate 18 will remain folded flush against the stationary back plate, however, should the motor malfunction then the stop plate 18 can be used to manually position the television at a usable height. In the case of a motor malfunction, then the attachment of the of motor and gearbox through apertures 66 of the moving front plate 14 is undone so that plate 14 is movable separate from the motorized drive. Then the front plate 14 and television can be lifted to a usable height and the hinge operated to move the stop plate 18 so that it is in a position normal to the stationary back plate 13 and the television will rest in the channel 42 on stop plate 18. When it is no longer desired to have the television in the raised position, the stop plate 18 may be folded inward and the front plate 14 and television lowered back into its recessed position.

Figure 10A:
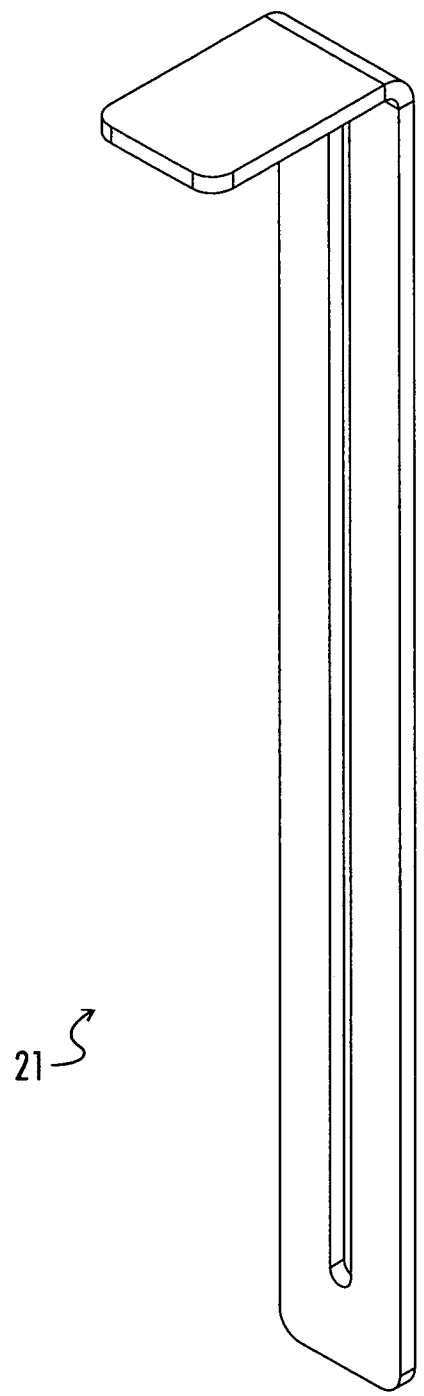
FIG. 10A is a perspective view of a lid support bracket of the lift system of FIG. 1.
Figure 10B:
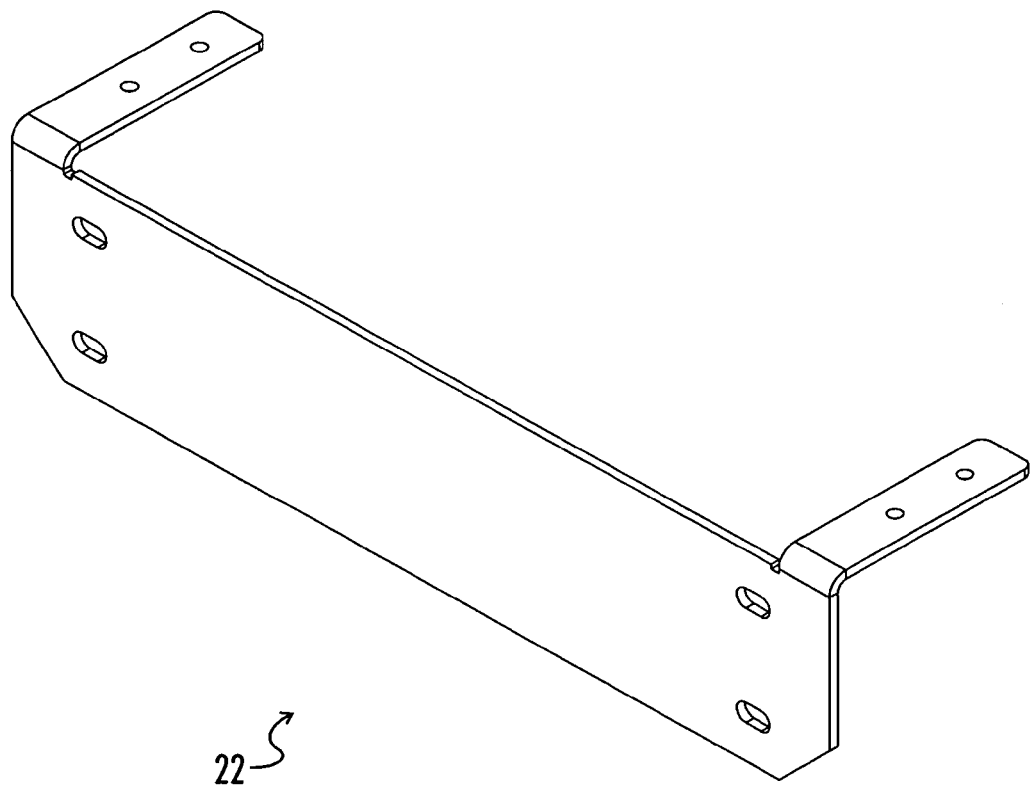
FIG. 10B is a perspective view of the lid bracket of the lift system of FIG. 1.
Figure 10C:
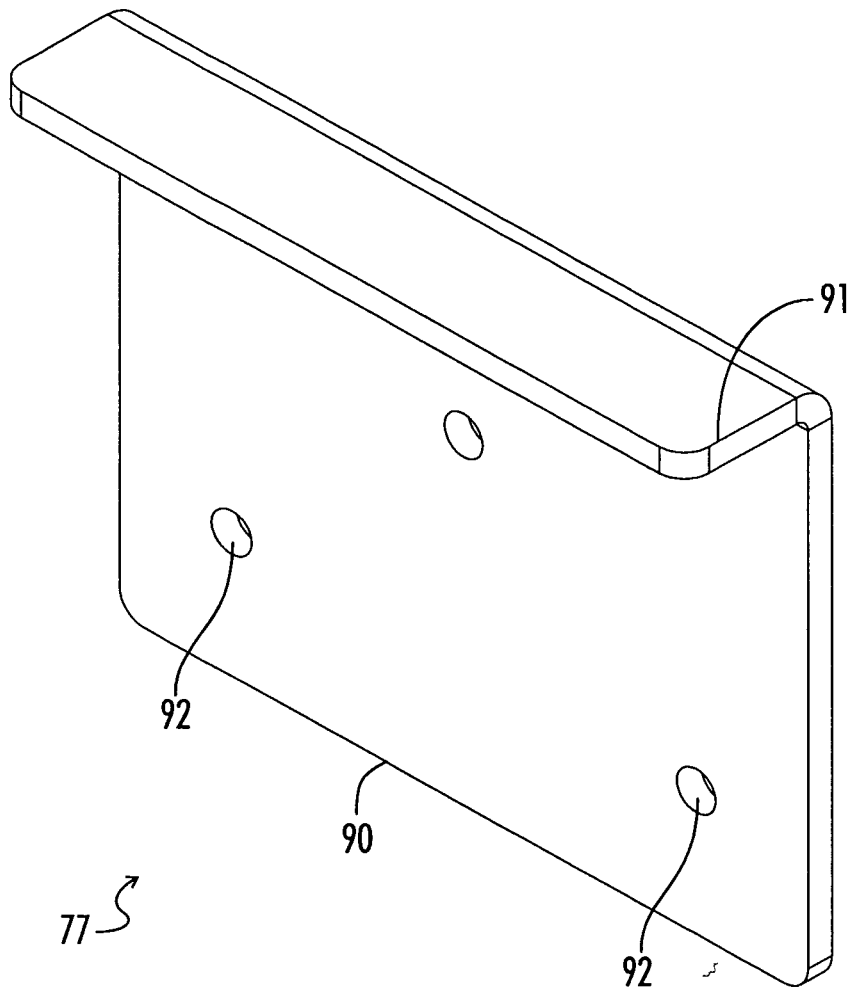
FIG. 10C is a perspective view of the stop bracket of the lift system of FIG. 1.

As a television exits a cabinet, a suitably sized lid either has to hinge back by approximately 90° or alternatively be lifted with the television. For a television lift capable of raising and lowering different sized televisions with a single stroke, the lid lifting and lowering must be self and independently positioning from the raising and lowering lift mechanism. This is achieved by fixedly mounting a lid lift bracket 22 (shown in FIG. 10A) to two vertically aligned independently adjustable slides 21 (shown in FIG. 10B) fixedly attached to the back side of the front moving plate 14. The slots in slides 21 are used to position the attached lid bracket 22 at the proper weight when an aesthetically appropriate lid is fixed on bracket 22.

To minimize the cost and weight of the lift system, the dual rack 24 and gears 47, 49 can advantageously be made of thermoplastic materials. Similarly, other components such as the motor cover 25 and cable mount plate 17 may also be made of thermoplastic materials. Generally the thermoplastic materials are preferred to have antistatic or non-dust attractant qualities, as by the incorporation of amorphous or crystalline carbon materials. The dual rack 24 and gears 47, 49 are advantageously made of crystalline or semi-crystalline polymers. In particular, polymers such as polyamide, polyester, polyolefin, and polyphenylene sulfide are suitable examples. In addition, the polymers may advantageously be self lubricating, as by incorporating one or more of silicone, polytetrafluoroethylene, carbon fiber, or molybdenum disulfide. To provide additional reinforcement to the thermoplastic materials the inclusion of glass fiber, carbon fiber or reinforcing filler materials may be advantageously employed.

To minimize torque moments associated with movement and operation of the lift system, it is preferable that the teeth 48, 50 of gears 47, 49 engaging with rows of teeth 40, 41 in the dual rack 24 are aligned central of the angled slides 20 attached between the angled end sections of the stationary back plate 13 and moving front plate 14. Torque is minimized when the center vertical plane of the two slides is also the plane of lifting.

It will also be understood that the motor 23 of the lift is operable by radiofrequency, infrared, or other communications typically implemented in audiovisual remote control systems. Furthermore, the electronics of the lift system may advantageously include a solenoid actuated shaft attached to the moving front plate 14 and capable of engaging the stationary back plate 13 when the television is in its full up position to help support the weight of the television. Electronics may also include detection of an amperage level that when exceeded will cut off the motor to prevent motor damage and/or a time shutoff control for the motor after it has operated for the length of time necessary to move from the full-up to full-down position or vice-versa. In addition, the on/off control of the television may be synchronized with the operation of the lift system so that the television is turned on when reaching the full up position and the television is turned off when the lift is operated to lower the television from its raised and visible position.

Figure 11A:
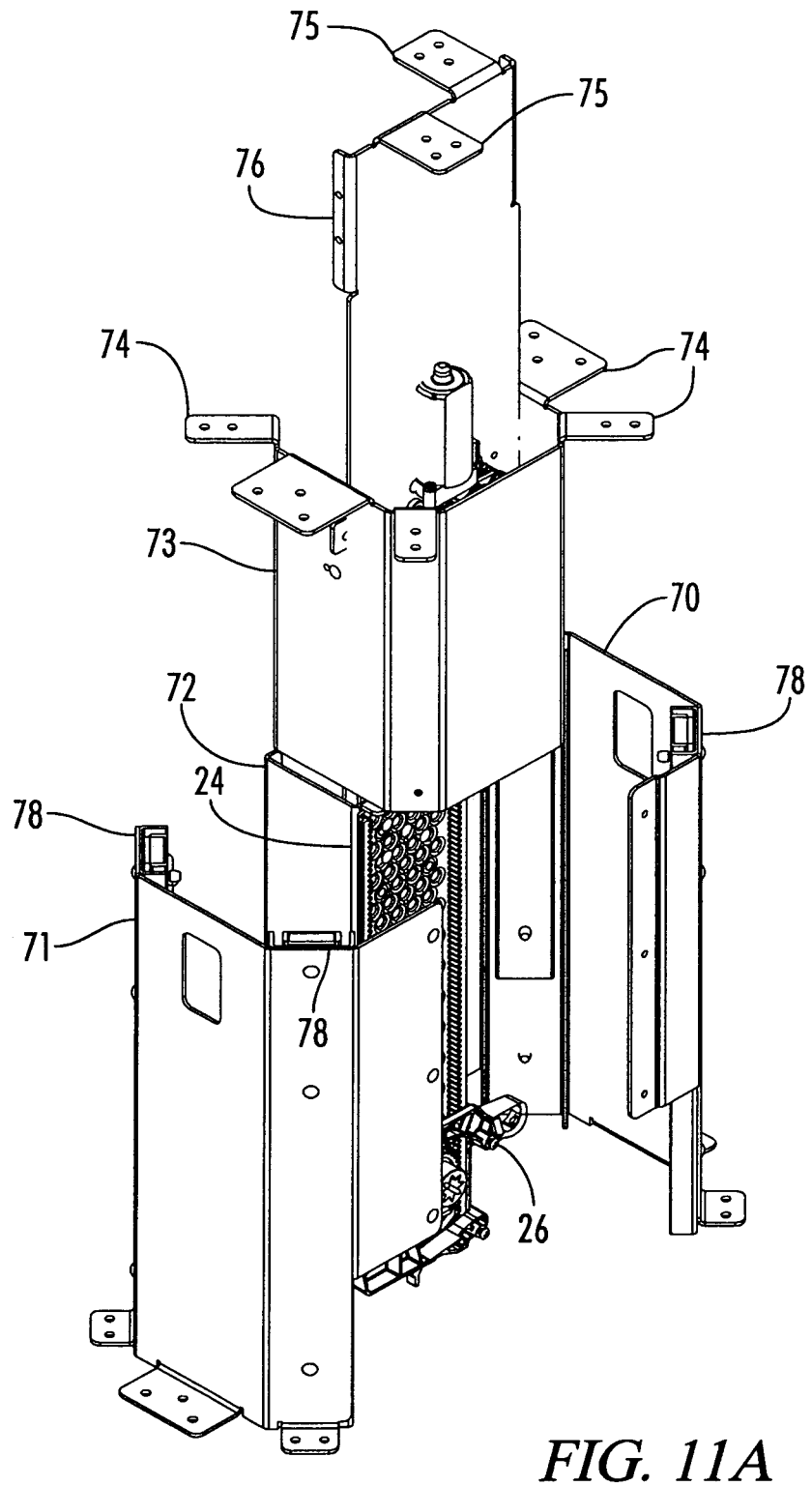
FIG. 11A is an exploded perspective view of an exemplary table lift system according to the present invention.
Figure 11B:
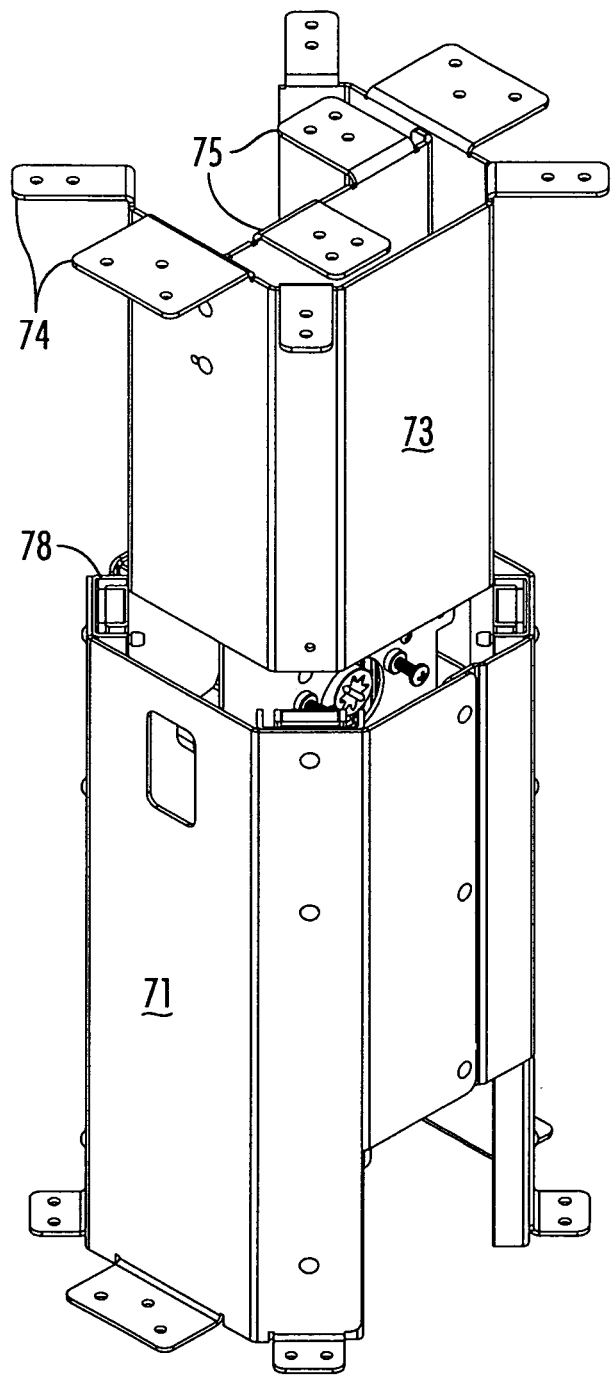
FIG. 11B is a perspective view of the table lift system of FIG. 11A in a fully extended position.
Figure 11C:
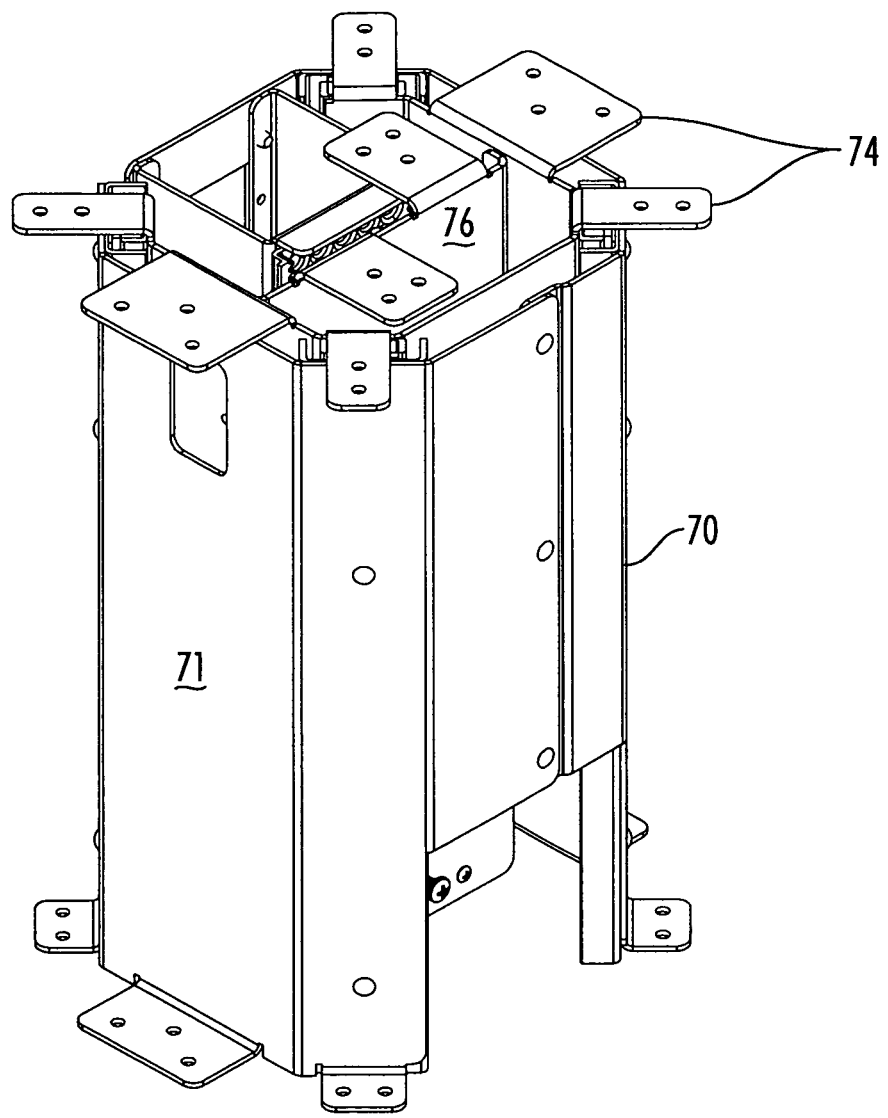
FIG. 11C is a perspective view of the table lift system of FIG. 11A in a fully collapsed position.

The lift of FIG. 1, adapted for use with flat screen televisions, is effectively a two-dimensional example of the present lift system which is generalized to a three-dimensional example in the lift system depicted in FIGS. 11A, 11B and 11C. Turning then to these figures, the lift system is shown with a base cage formed of a pair of outer wrap brackets 70, 71, a central rack support bracket 72, a moving inner cage or bracket 73, a motor bracket plate 76, a rack 24, a gearbox 26, a motor 23, and a plurality of slides 78. This illustrated lift system is particularly adapted for a coffee table or small dining table, perhaps of 45 inches square. Coffee tables typically have a top surface height of about 18 to 20 inches, while dining tables have a top surface height of approximately 29 to 31 inches. The objective of the lift therefore, is to raise the tabletop approximately 1 foot, or about 10 to 14 inches, while providing stability without shaking or jarring during the raising and lowering motion. The table should also have sufficient stability in the up position to avoid toppling under an uneven load, as might be applied by a person leaning or sitting upon an edge or corner of the table.

The design chosen for this square table with 45 inch sides, utilizes four slides 78 that are angled and positioned at the corners of the lift. The movement is operated by a worm gear motor driven dual rack and pinion drive positioned beneath the center of mass of the table. The dual rack 24 is attached to the rack support bracket 72 that together with the outer wrap brackets 70, 71 are mounted to a stationary base or other structure. Stationary components of slides 78 are attached to outer wrap brackets 70, 71. The motor (not shown) is mounted upon the motor bracket plate 76 and to the gearbox 26. The motor bracket plate 76 is also connected to the moving inner brackets 73, 74 which has angled or beveled corners that are connected to the sliding portions of angled slides 78. The moving bracket 73 has horizontal tables 74 and the motor bracket plate 76 has horizontal tabs 75. These horizontal tabs 74, 75 are fastened to the bottom surface of the table top (not shown).

When the motor is energized, the pinion drive lifts the tabletop to the extended position shown in FIG. 11B while the plurality of angled slides 78 independently provide stability. The drive motor may be plugged into a household power supply, however, to facilitate the positioning of the lift table, it is desirable to provide a drive motor attached to a dry cell rechargeable battery pack, that is in turn attached to a renewable power supply. The drive motor may be energized either by a spring-loaded toggle switch or a remote control manually operated button.

For the tabletop with 45 inch sides, the spacing of the slides 78 approximately 9 inches apart, results in a very stable lift in both fixed up and down positions and during its intermediate movement. The slide spacing may be increased or decreased depending upon the load to be lifted, the material and thickness of the individual components, and the loadbearing capability of the slides. As with the television lift, ball bearing slides produce the most advantageous results. Coupling of the angled slides to a single lift mechanism produces very smooth action throughout the start, stop and intermediate movement of the lift. In contrast, the use of prior art multiple drives as disclosed in the Nexus 21 TV Lift System Model DL-3 results in non-synchronized motion, is jarring to the lift surface, and is relatively costly. As previously mentioned, the position of the rack and pinion drive mechanism is preferably central to the center of mass of the tabletop that is being lifted, and the positioning of the extensible slides 78 is also designed to minimize torque moments. By minimizing torque associated with the rack and pinion drive mechanism and the slide stabilizing mechanism, a fluid and continuous movement of the lift is facilitated with little jarring or wobbling action.

Figure 12A:
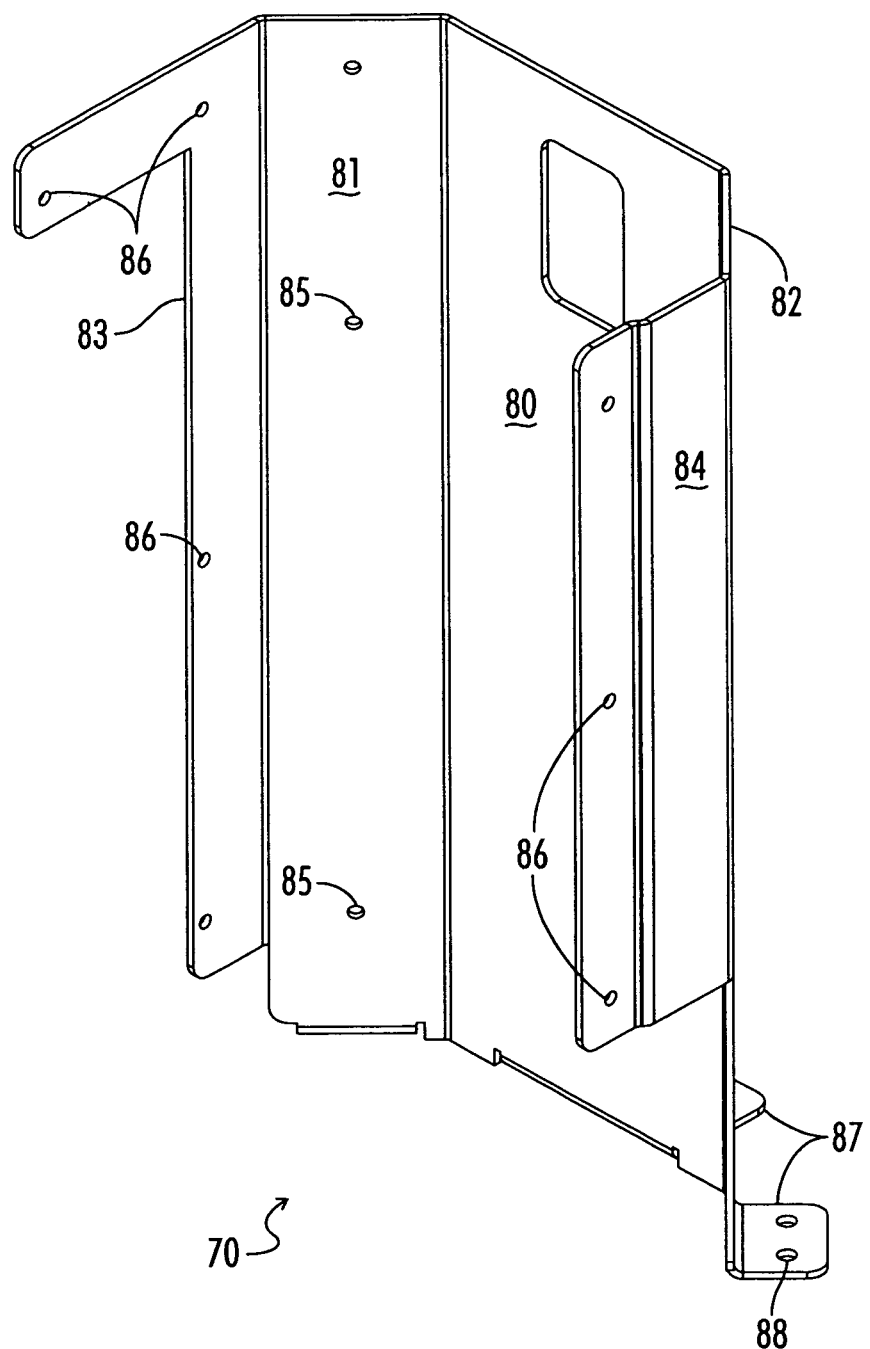
FIG. 12A is a perspective view of a first outer wrap bracket of the lift assembly of FIG. 11A.
Figure 12B:
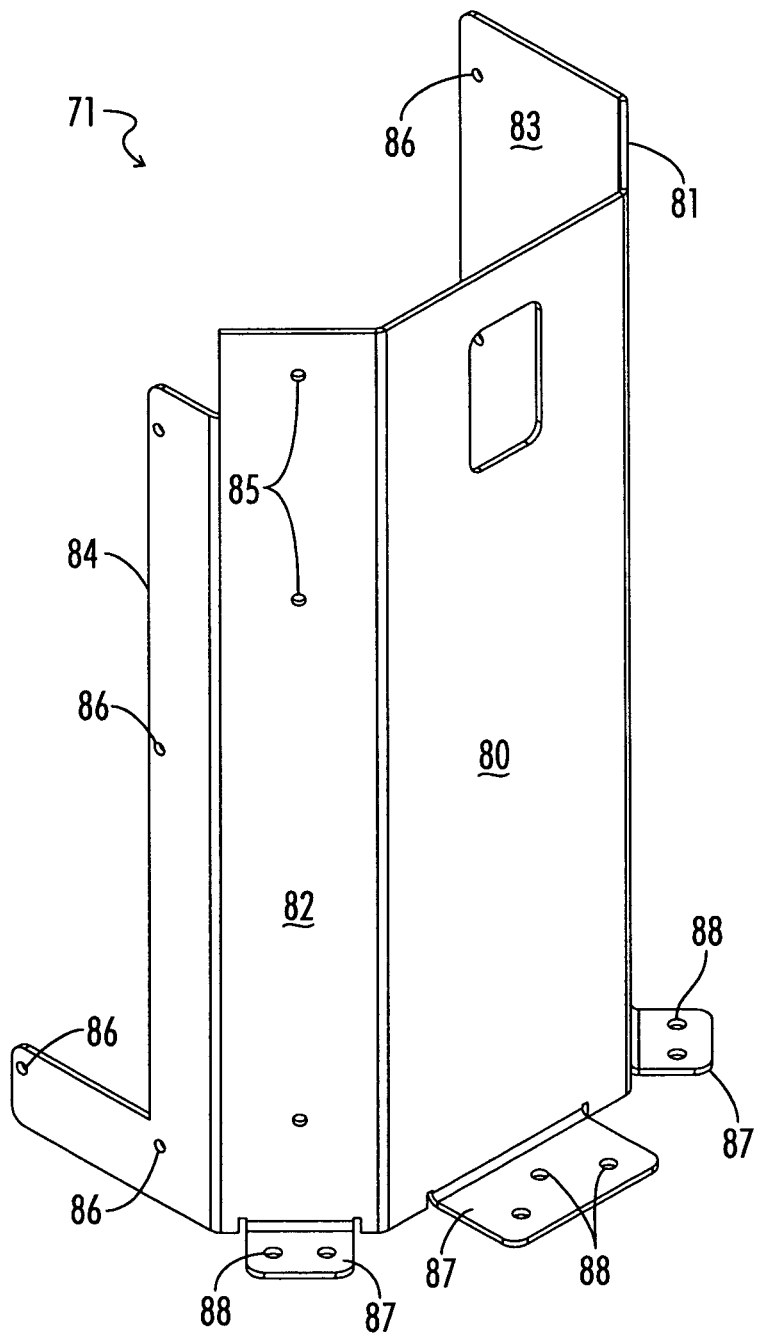
FIG. 12B is a perspective view of a second outer wrap bracket of the lift assembly of FIG. 11A.

Turning to FIG. 12A it can be seen that the first outer wrap bracket 70 has a center panel 80 and on either side an angled slide holding panel 81, 82 set at approximately a 45° angle from the plane of the center panel 80. The angled panels 81, 82 have a plurality of apertures 85 to secure the nonmoving portion of attached slides 78. In FIG. 12B, the second outer wrap bracket 71 has a very similar structure. Lugs 87 are fixed along the bottom edge of the outer wrap brackets 70, 71 and fasteners are placed through openings 88 to secure the outer wrap brackets to a table base. To either side of the angled panels 81, 82 are edge tabs 83, 84 with apertures 86 for fastening purposes.

Figure 13:
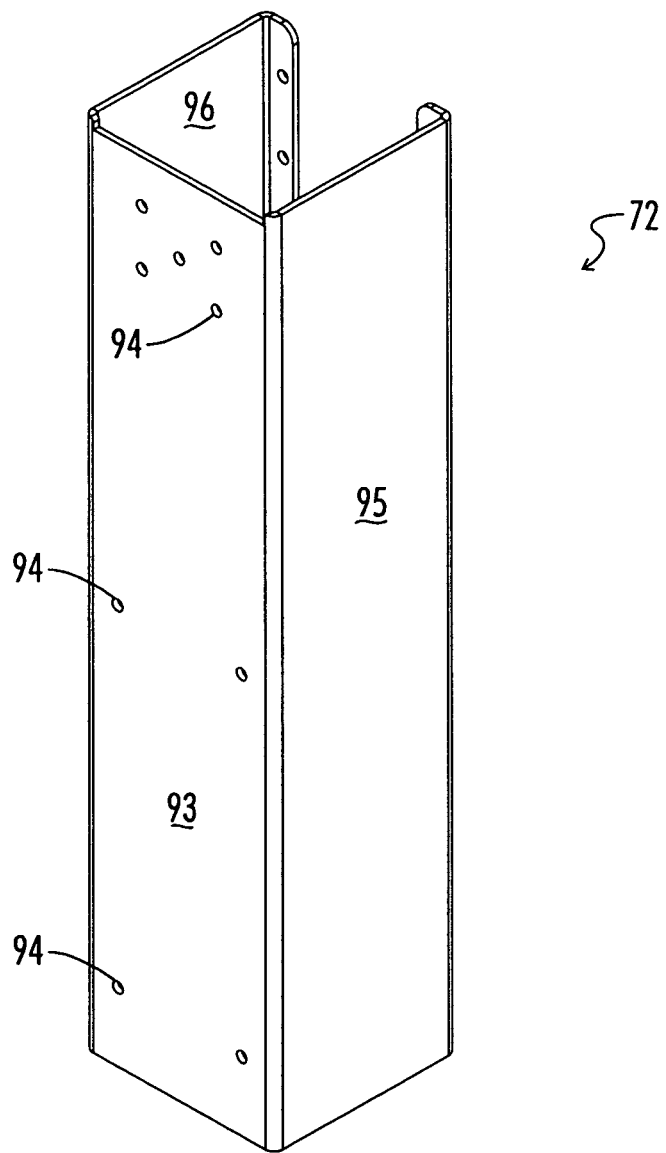
FIG. 13 is a perspective view of the rack support bracket of the lift assembly of FIG. 11A.
Figure 14:
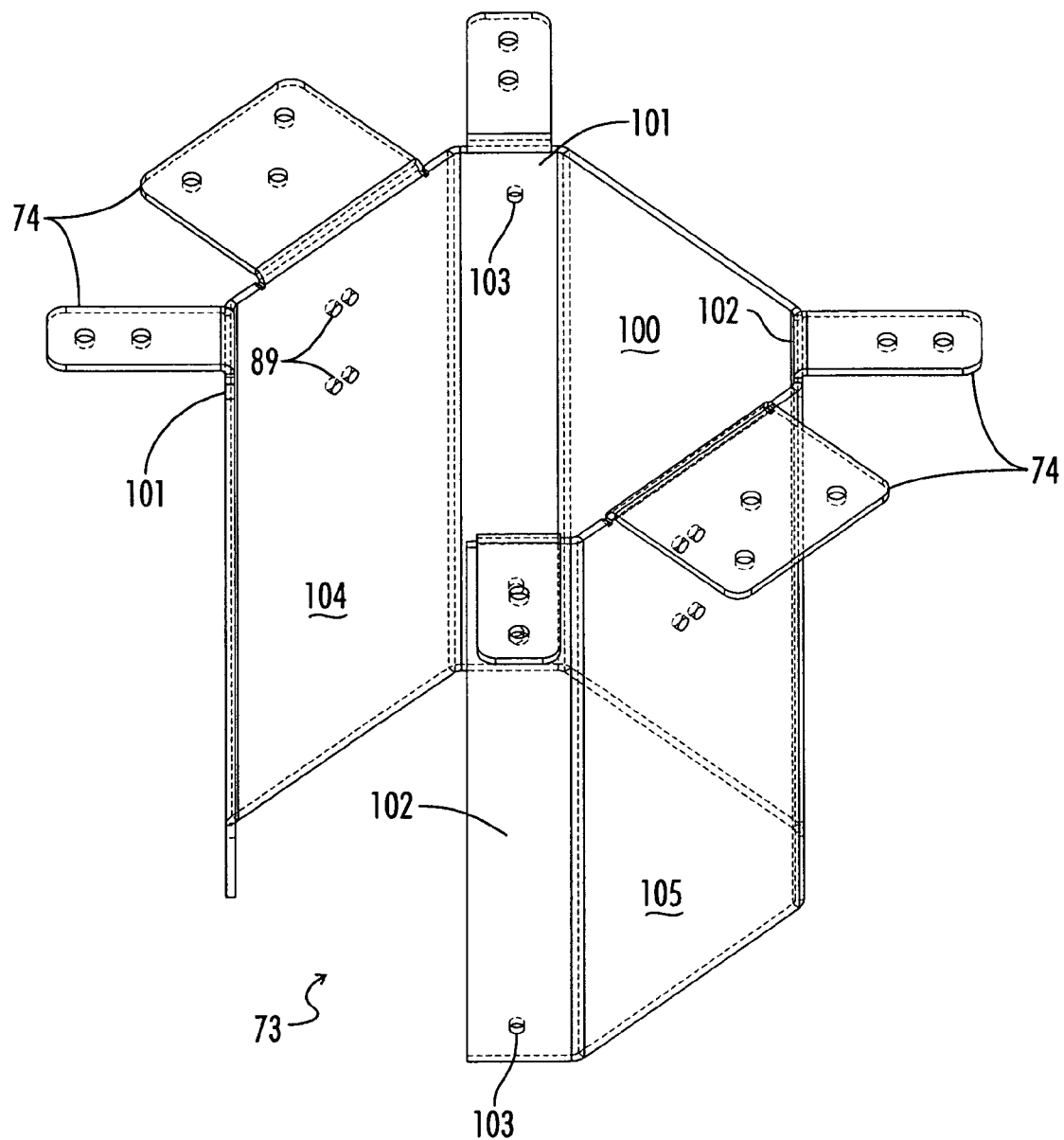
FIG. 14 is a perspective view of the inner slide bracket of the lift assembly of FIG. 11A.

FIG. 13 shows the rack support bracket 72 in isolation, including a rack mounting surface 93 with mounting apertures 94. To either side of the rack mounting surface 93 is a sidewall 95, 96. Although not shown, to the bottoms of each sidewall 95, 96 may be attached tab sections with tab apertures for fastening purposes. An exemplary moving bracket 73 is shown in FIG. 14 with a center panel 100 and angled pairs of side panels 101, 102 at either side and at a 45° angle to the plane of the center panel 100 and approximately 90° to one another. Pairs of angled side panels 101 are separated by wall 104 while pairs of side angles 102 are separated by wall 105. Apertures 103 are provided in the side panels 101, 102 in order to attach the moving portion of slides 78. Horizontal tabs 74 are provided with openings to facilitate fastening to the bottom of a table top.

Figure 15:
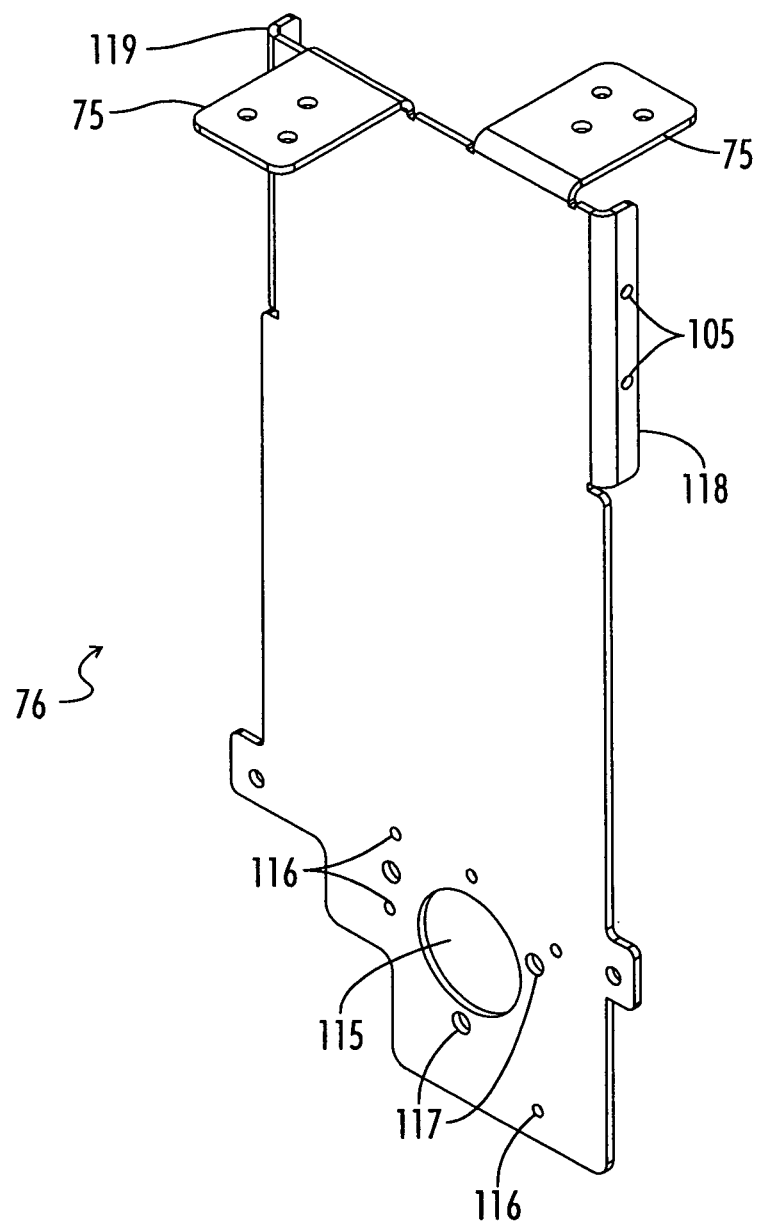
FIG. 15 is a perspective view of the motor bracket of the lift of FIG. 11A.

FIG. 15 illustrates the motor bracket plate 76 which has a central aperture 115 to permit the motor to connect and drive the pinion gear. Apertures 117 allow the motor to be mounted to the motor bracket plate 76 while apertures 116 permit the motor bracket plate 76 to be fastened to the gearbox 26. The edge tabs 118 and 119 are used to connect the motor bracket plate 76 to the moving bracket 73 with fasteners passing through apertures 105 of tab 118 and 89 of bracket 73. The motor may be of the worm type driving a single gear that in turn drives a slave gear. Alternatively, the motor may be of a double ended worm type with opposite rotational helix that drives both gears engaging the double rack 24. In yet another alternative, structure, the motor may be a worm type motor with an elongated shaft that comprises to opposite rotational helix aligned to drive both gears along the rack. The worm helix angle may be selected to impart little or no back drive. As described in connection with the lift of FIG. 1, the dual rack 24, gears and gearbox can advantageously be formed of thermoplastic material, with crystalline or semi-crystalline polymers being a preferred class of materials. Such polymers including polyamide, polyester, polyolefin, and polyphenylene sulfide. These thermoplastics may also be formulated to be a self lubricating as previously described.

All publications, patents and patent documents are incorporated by reference herein as though individually incorporated by reference. Although preferred embodiments of the present invention have been disclosed in detail herein, it will be understood that various substitutions and modifications may be made to the disclosed embodiment described herein without departing from the scope and spirit of the present invention as recited in the appended claims.

I claim:

1. A household lift system for a movable object comprising:
    a stationary member having a planar orientation fixed to a base;
    a stationary rack;
    a motor for driving gears engaged with the rack and thereby moving a motor mount along the rack;
    a moving member attached to the motor mount, said moving member being adapted for attachment to the movable object;
wherein a pair of extensible slides, each extending outward at approximately 45° from the planar orientation of the stationary member so as to be positioned at approximately right angles to one another, each have a stationary portion joined to the stationary member and a movable portion joined to the moving member whereby the movement of the moving member relative to the stationary member is constrained to a linear direction parallel to the rack.

2. The household lift system of claim 1 wherein the stationary rack and driving gears are a dual rack and pinion drive mechanism.

3. The household lift system of claim 1 wherein the motor is of the worm type and drives a first gear, said first gear in turn driving a slave gear, and said first gear and slave gear engaging the rack.

4. The household lift system of claim 1 wherein the rack is a dual rack made of a engineered type of thermoplastic of the class of crystalline and semi-crystalline polymers.

5. The household lift system of claim 4 wherein the thermoplastic incorporates at least one of the group of silicone, polytetrafluoroethylene, carbon fiber, molybdenum disulfide, to render the thermoplastic self-lubricating.

6. The household lift system of claim 4 wherein the thermoplastic includes a reinforcing material.

7. The household lift system of claim 4 wherein the thermoplastic incorporates amorphous or crystalline carbon material to provide antistatic properties.

8. The household lift system of claim 1 wherein the stationary member has a central planar portion for attaching the stationary rack, an offset planar portion to either side of the central planar portion for attachment to the base, said base having a vertical attachment surface, and to the exterior of each offset planar portion is an angled planar portion extending forward away from the base at an orientation of approximately 45 degrees, and the stationary portion of each of the pair of extensible slides is attached to the angled planar portions.

9. The household lift system of claim 8 wherein the moving member has a generally planar surface with angled planar portions at each side that are positioned rearwardly through an arc of approximately 135 degrees and to which are attached the movable portions of each of the pair of extensible slides.

10. The household lift system of claim 9 wherein the moving member has a plurality of vertical rows of attachment points.

11. The household lift system of claim 9 wherein the moving member has at least one horizontal slot for receiving a stop bracket.

12. The household lift of claim 8 wherein the central planar section and attached rack are positioned in an offset from the offset planar portions so that the rack is aligned in a vertical plane with the centers of the extensible slides.

13. The household lift system of claim 10 wherein the movable object is a television, and said television is fastened to a mount plate adapted to be secured at attachment points on the moving member.

14. The household lift system of claim 1 wherein the stationary member is comprised of an outer cage formed to two halves joined to one another and secured at their bottom edges to the base.

15. The household lift system of claim 14 wherein the rack is supported in a stationary vertical position by a separate rack support bracket.

16. The household lift mechanism of claim 15 wherein the movable member forms an interior cage and two pairs of extensible slides have stationary portions fixed to the outer cage and movable portions fixed to the inner cage.

17. The household lift system of claim 16 wherein the interior cage has tabs with attachment points for securing to a table top.

18. The household lift system of claim 16 wherein the motor mount is secured across the interior of the inner cage.

19. A monitor lift comprising:
a base mount in a fixed position and having a central rack mounting section interior of a pair of offset spacing sections that are in turn interior of a pair of angled slide holding sections that are respectively angled forward from the plane of the central rack mounting section at about 45° such that the pair of angled slide holding sections are at substantially right angles to one another;
a dual rack mounted to the central rack mounting section;
a pair of slides each with a fixed portion secured to one of the pair of angled slide holding sections of the base mount, and with a slideable portion;
a motor for causing the rotation of a pair of gears engaging with the dual rack;
a housing for the pair of gears that moves with the gears as they travel along the dual rack;
a moving plate moving with the housing, said moving plate having spaced apart vertical rows of slots and a pair of horizontal slots, and a pair of rearwardly angled slide attaching sections attached to the slideable portions of the pair of slides;
a cable mount providing cable attaching separators that move with the moving plate;
a monitor mount plate attachable to the rear of a monitor and having rearwardly extending tabs, spaced apart to be received in the vertical rows of slots of the moving plate;
a hinged stop plate that is fixed to and folded against the base mount when the moving plate is in lowered position and can be unfolded when the moving plate is in raised position and retains the moving plate in raised position;
a lid attached above the moving plate.

* * * * *